United States Patent
Zhang et al.

(10) Patent No.: US 12,306,702 B2
(45) Date of Patent: May 20, 2025

(54) CONTROLLING AN AMOUNT OF DATA USED BY A BASEBOARD MANAGEMENT CONROLLER TO PERFORM HARDWARE FAILURE PREDICTION

(71) Applicant: Lenovo Enterprise Solutions (Singapore) Pte Ltd., Singapore (SG)

(72) Inventors: Caihong Zhang, Shanghai (CN); Ming Lei, Shanghai (CN); Fred Allison Bower, III, Durham, NC (US); Jiang Chen, Shanghai (CN)

( * ) Notice: Subject to any disclaimer, the term of this patent is extended or adjusted under 35 U.S.C. 154(b) by 44 days.

(21) Appl. No.: 18/487,233

(22) Filed: Oct. 16, 2023

(65) Prior Publication Data
US 2024/0362100 A1  Oct. 31, 2024

Related U.S. Application Data

(63) Continuation of application No. PCT/CN2023/090773, filed on Apr. 26, 2023.

(51) Int. Cl.
*G06F 11/00*  (2006.01)
*G06F 11/07*  (2006.01)

(52) U.S. Cl.
CPC ...... *G06F 11/0757* (2013.01); *G06F 11/0709* (2013.01)

(58) Field of Classification Search
CPC .......................... G06F 11/0757; G06F 11/0709
See application file for complete search history.

(56) References Cited

U.S. PATENT DOCUMENTS

| | | | |
|---|---|---|---|
| 11,847,009 B1* | 12/2023 | Khosrowpour | G06F 11/3433 |
| 2020/0225655 A1* | 7/2020 | Cella | H04L 1/0076 |
| 2021/0004253 A1 | 1/2021 | Barnes et al. | |
| 2021/0081266 A1 | 3/2021 | Kern et al. | |
| 2023/0016735 A1* | 1/2023 | Itsuji | G06F 11/2273 |

(Continued)

FOREIGN PATENT DOCUMENTS

| | | |
|---|---|---|
| CN | 105940637 A | 9/2016 |
| CN | 106603265 A | 4/2017 |

OTHER PUBLICATIONS

Espacenet.com, English translation of CN 105940637 A, Sep. 14, 2016, Abstract.

(Continued)

*Primary Examiner* — Bryce P Bonzo
*Assistant Examiner* — Audrey Emma Whitesell
(74) *Attorney, Agent, or Firm* — Jeffrey L. Streets

(57) ABSTRACT

A computer program product, a method and a baseboard management controller for performing the operations of computer program product or method. The operations include identifying a current utilization level of the processor of the baseboard management controller, obtaining hardware performance data for hardware devices installed in a server that includes the baseboard management controller, running an application program that performs hardware failure prediction, and controlling an amount of the hardware performance data that is used by the application program to perform the hardware failure prediction, wherein the amount of the hardware performance data is controlled as a function of the current utilization level of the processor.

20 Claims, 3 Drawing Sheets

(56) References Cited

U.S. PATENT DOCUMENTS

2023/0105565 A1* 4/2023 Risbud ................ G06F 11/073
                                                                  714/704

OTHER PUBLICATIONS

Espacenet.com, English translation of CN 106603265 A, Apr. 26, 2017, Abstract.
The International Bureau of WIPO, International Search Report and Written Opinion for International Application PCT/CN2023/090773 filed on Apr. 26, 2023; mailed on Dec. 5, 2023.

* cited by examiner

CONTROLLING AN AMOUNT OF DATA USED BY A BASEBOARD MANAGEMENT CONROLLER TO PERFORM HARDWARE FAILURE PREDICTION

BACKGROUND

The present disclosure relates to systems, methods and computer program products for managing workload assigned to a baseboard management controller.

BACKGROUND OF THE RELATED ART

A Baseboard Management Controller (BMC) is the central management module on a server. The BMC manages the interface between system management software and platform hardware. The BMC monitors various types of sensors built into the server and can provide alerts to a system administrator over a network. Furthermore, a remote system administrator may communicate with the BMC over the network to cause the BMC to take corrective actions within the server.

The substantial utility of the BMC has led developers to place additional functionality and capacity in the BMC. However, a growing number of management tasks are being required of the BMC, such that the BMC may periodically experience heavy workloads. Unfortunately, the increasing load on the BMC may cause latency of some services performed by the BMC, such as thermal control, sensor monitoring, firmware update, federation and the like.

BRIEF SUMMARY

Some embodiments provide a computer program product comprising a non-volatile computer readable medium and non-transitory program instructions embodied therein, the program instructions being configured to be executable by a processor of a baseboard management controller to cause the processor to perform various operations. The operations comprise identifying a current utilization level of the processor of the baseboard management controller, obtaining hardware performance data for hardware devices installed in a server that includes the baseboard management controller, running an application program that performs hardware failure prediction, and controlling an amount of the hardware performance data that is used by the application program to perform the hardware failure prediction, wherein the amount of the hardware performance data is controlled as a function of the current utilization level of the processor.

Some embodiments provide a method comprising a baseboard management controller identifying a current utilization level of a processor of the baseboard management controller, the baseboard management controller obtaining hardware performance data for hardware devices installed in a server that includes the baseboard management controller, the baseboard management controller running an application program that performs hardware failure prediction, and the baseboard management controller controlling an amount of the hardware performance data that is used by the application program to perform the hardware failure prediction, wherein the amount of the hardware performance data is controlled as a function of the current utilization level of the processor.

Some embodiments provide a baseboard management controller comprising at least one non-volatile storage device storing program instructions and at least one processor configured to process the program instructions. The program instructions are configured to, when processed by the at least one processor, cause the baseboard management controller to perform operations comprising identifying a current utilization level of the processor of the baseboard management controller, obtaining hardware performance data for hardware devices installed in a server that includes the baseboard management controller, running an application program that performs hardware failure prediction, and controlling an amount of the hardware performance data that is used by the application program to perform the hardware failure prediction, wherein the amount of the hardware performance data is controlled as a function of the current utilization level of the processor.

DETAILED DESCRIPTION

Figure 1:
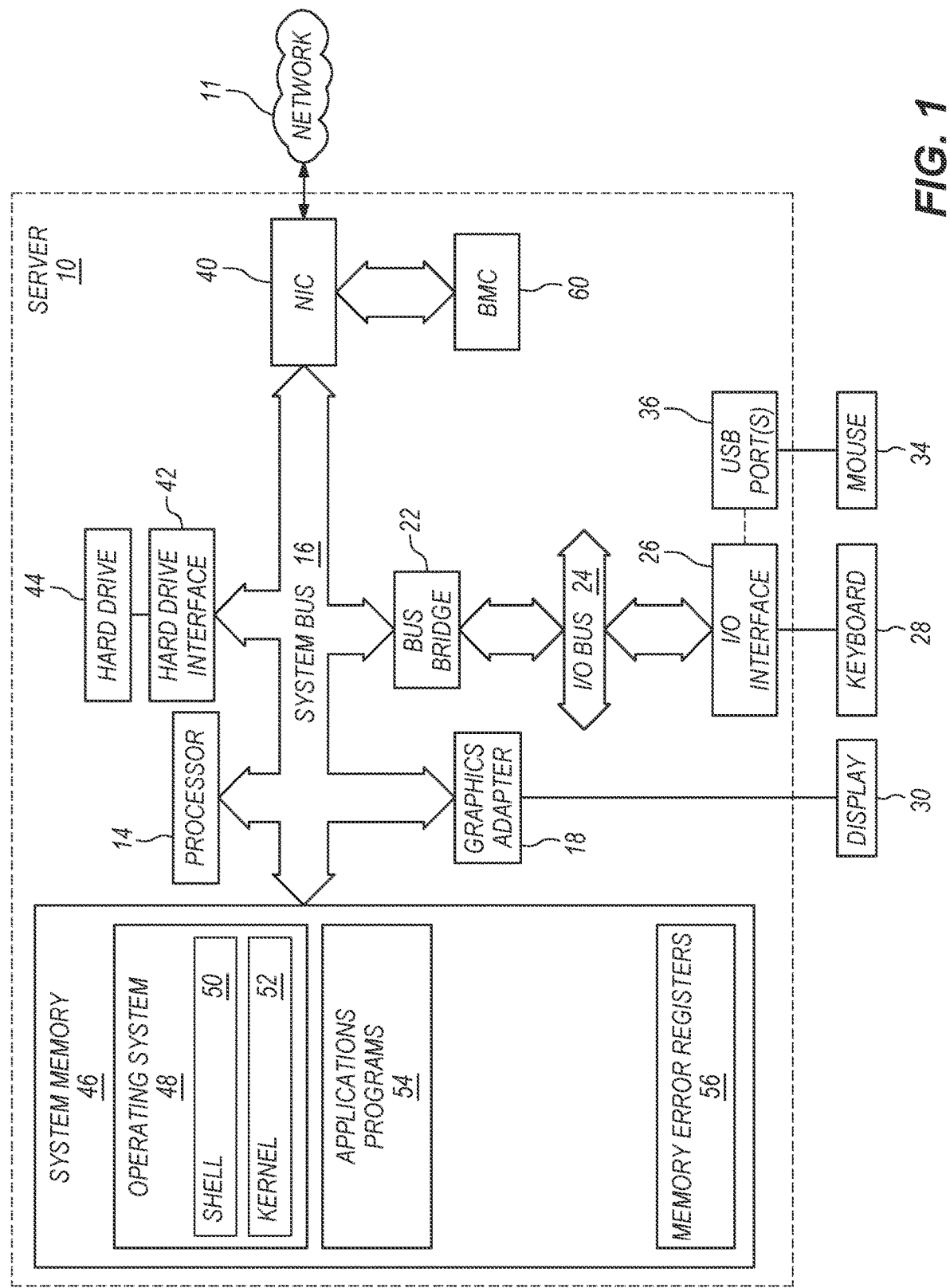
FIG. 1 is a diagram of one embodiment of a server according to some embodiments.

Some embodiments provide a computer program product comprising a non-volatile computer readable medium and non-transitory program instructions embodied therein, the program instructions being configured to be executable by a processor of a baseboard management controller to cause the processor to perform various operations. The operations comprise identifying a current utilization level of the processor of the baseboard management controller, obtaining hardware performance data for hardware devices installed in a server that includes the baseboard management controller, running an application program that performs hardware failure prediction, and controlling an amount of the hardware performance data that is used by the application program to perform the hardware failure prediction, wherein the amount of the hardware performance data is controlled as a function of the current utilization level of the processor.

The baseboard management controller (BMC) is a component installed on the motherboard of a server to manage the interface between system management software and hardware devices installed in the server. The BMC may monitor various types of sensors built into the server and provide alerts to a system administrator over a network. A processor or CPU component of the BMC operates independent of the host processor or CPU of the server.

The BMC may obtain hardware performance data from various hardware components of the server, such as memory modules or input/output devices. The hardware performance data may be any measured quantity of performance that is relevant to a hardware failure prediction application program. The nature of the hardware performance data may vary according to the type of hardware device and the most-common failure modes for the hardware device. However, the hardware performance data is preferable data that is already made available by existing hardware devices and/or existing sensors that monitor the hardware devices.

In one non-limiting example, the hardware component is a memory module, and the hardware performance data includes memory error data. Optionally, the memory error data may identify the specific memory module that experienced the memory error and may identify a type of the memory error. For example, the memory error data may identify a cumulative number of correctable memory errors over a recent period of time. The specific memory module may be identified in many ways, such as by a serial number and/or a slot location where the memory module is installed. The type of memory error may identify the severity of the error, such as indicating whether the error was or was not correctable. In another example, the hardware performance data may be a measure of wear on the hardware device, such as the number of write cycles on a flash memory device.

After obtaining the hardware performance data, the baseboard management controller may process the hardware performance data using an application program, such as an artificial intelligence (AI) engine, to perform hardware failure prediction. Accordingly, the BMC runs the application program to process the hardware performance data as input and predict a hardware device failure. If the application program predicts a hardware device failure, then the BMC may send a hardware failure alert or notification to a host device or user interface, such as a BMC web interface or a user's email address. The hardware failure alert preferably identifies a specific hardware device that is predicted to fail, such that the host device or user may repair or replace the affected hardware.

In some embodiments, the application program may perform hardware failure prediction, such as memory failure prediction (MFP). Optionally, the application program may include an artificial intelligence (AI) model for hardware failure prediction, where the AI model may be trained and then built into an AI engine to perform hardware failure prediction, such as memory failure prediction (MFP). The AI model may be trained using hardware performance and failure data collected from a large number of servers running over an extended period of time. Preferably, the AI model is trained in a separate computer environment, such as a computer lab that has substantial processing capacity and access to large amounts of historical hardware performance data. The trained AI model may then be incorporated into an AI engine that can be run by the processor of the BMC. Accordingly, the BMC may regularly pull memory performance data, such as memory correctable error (CE) data, and then run the AI engine against the memory performance data to predict a possible or potential memory failure.

Running the application program on the BMC may consume a substantial amount of the BMC's CPU resource and memory resource, especially on a high-end server which is memory-rich and may negatively impact the performance of other management functions such as thermal control, sensor monitoring, installing firmware updates, and federation on the BMC. By controlling the amount of the hardware performance data that is used to perform the hardware failure prediction as a function of the current utilization level of the processor, the load on the BMC CPU does not interfere with the performance of the routine yet important management functions. Embodiments may perform management functions without regard to the current utilization level of the processor.

In some embodiments, the BMC may obtain memory performance data from a memory device, memory module, or memory controller. For example, the BMC may pull or read memory performance data from a memory error register on the memory device, memory module, or memory controller. Optionally, the BMC may periodically obtain the memory performance data at regular or irregular intervals or in response to detecting a certain event. In one option, the BMC may dynamically adjust the frequency at which the BMC pulls the memory performance data from the memory register depending upon an interval at which the memory performance data is needed by the application program, which may include a memory failure prediction AI engine within a container. Memory failure is one of the main reasons causing a server to shut down. As a result, the ability to predict memory failures and take proactive actions that prevent a server shut down is highly valuable.

A utilization level of the processor is a measure of the amount of work being handled by the processor, which may vary based on the number and type of computing tasks being performed by the processor at any point in time. The utilization or performance of the processor may be measured units of power consumption or millions of instructions per second (MIPS), but the utilization level is preferably stated as a percentage of full utilization or capacity. For example, if the processor has a nominal capacity of 100,000 MIPS and is currently performing 50,000 MIPS, then it can be stated that the processor has a current utilization of 50% (i.e., a normalized current utilization of 0.5; where full utilization of the 100,000 MIPS would have a normalized utilization of 1.0). Some embodiments are directed to BMC workload scheduling to optimize BMC operations under conditions of high or over-subscribed load.

In some embodiments, the application program may be included in a container. A container is a package of software that contains all the necessary elements to run in any environment so that the container may be run anywhere. For example, in addition to the application program itself, the container may include only those portions of an operating system that are required to run the application program, such as particular system tools, system libraries and settings. The size of the container is minimized by excluding portions of the operating system that would not be utilized to run the particular application program in the container. Optionally, the container may be stored in firmware of the baseboard management controller.

In some embodiments, the application program may perform hardware failure prediction, such as memory failure prediction (MFP). Optionally, the application program may include an artificial intelligence (AI) model for hardware failure prediction, where the AI model may be trained and then built into an AI engine to perform hardware failure prediction, such as memory failure prediction (MFP). The AI model may be trained using hardware performance and failure data collected from a large number of servers running over an extended period of time. Preferably, the AI model is trained in a separate computer environment, such as a computer lab that has substantial processing capacity and access to large amounts of historical hardware performance data. The trained AI model may then be incorporated into an AI engine that can be run in the BMC and/or an optional Smart NIC. Accordingly, the BMC may regularly pull memory performance data and then run the AI engine against the memory performance data to predict a possible or potential memory failure. However, running the AI engine on the BMC in this manner may consume a substantial amount of the BMC's CPU resource and memory resource, especially on a high-end server which is memory-rich, and may negatively impact the performance of other management functions such as thermal control, sensor monitoring, installing firmware updates, and federation on the BMC.

In some embodiments, the operations may further include sending a notification to a host device or user, where the notification identifies one or more unit of hardware that is subject to the hardware failure alert. The BMC may direct the notification to a host device and/or a user, where the notification identifies the predicted failure of a specific hardware device. Accordingly, the host device and/or the user may take steps to repair or replace the affected hardware, or perhaps redirect workload away from the identified hardware device. Nonlimiting examples of a notification may include an alert (audible or visual) or a message (text, email, popup, banner, etc.). Optionally, the notification may be directed to a web browser or an email address.

In some embodiments, a BMC task scheduler may detect that the BMC CPU is experiencing a heavy workload and take steps to prevent or reduce an amount of workload to be placed on the BMC CPU by one or more application programs that are important, but not urgent, such as hardware failure prediction. In one option, the amount of workload placed on the BMC CPU by an application program may be reduced by delaying performance of the application program and/or reducing the frequency at which the application program is run. In another option, the amount of workload placed on the BMC CPU by the application program may be reduced by reducing the amount of hardware performance data that is input to the application program if the BMC CPU is already experiencing a computational load that is greater than a predetermined load setpoint. By reducing the amount of hardware performance data that is input to the application program, the application program will consume less of the capacity (i.e., maximum computational load) of the BMC CPU, yet the server will still benefit from the use of the application program. In one option, the amount of hardware performance data input to the application program may be reduced by a percentage of an amount of hardware performance data that may be typically (or on average) input to the application program.

In some embodiments, the operation of controlling the amount of the hardware performance data that is used by the application program to perform the hardware failure prediction may include reducing the amount of the hardware performance data that the application program will analyze as an inverse function of the current utilization level of the processor. In other words, the amount of hardware performance data may be reduced as the current utilization level of the processor increases, and the amount of hardware performance data may be increased as the current utilization level of the processor decreases. In one option, the current level of processor utilization may be input into a calculation or used to reference a lookup table in order to determine an amount of the hardware performance data that may input for use by the application program. For example, if the typical batch size of hardware performance data is normalized to a value of 1 and the maximum BMC CPU utilization is normalized to a value of 1, then the normalized batch size may be about 1 at all BMC CPU utilizations less than 0.5 and may be reduced to a normalized batch size of about 2×(1−current BMC CPU utilization) at all BMC CPU utilizations greater than 0.5. In one option, the term "batch size" may be interpreted consistent with the term's use in machine learning. For example, an epoch elapses when an entire dataset is passed forward and backward through a neural network exactly one time. If the entire dataset cannot be passed into the algorithm at one time, it must be divided into mini batches. Batch size is the total number of training samples present in a single min-batch. An iteration is a single gradient update (update of the model's weights) during training. The number of iterations is equivalent to the number of batches needed to complete one epoch.

In some embodiments, the amount of hardware performance data input to the application program at any particular time may be referred to as a "batch size." In other words, the batch size may be the number of data samples (e.g., DIMM memory correctable error register values) that the tester wants the algorithm to process together in one set of operations. For example, the typical or average batch size may be normalized to a value of one (1), then a reduced batch size may be described by any value less than one (1). Similarly, the typical or average batch size may be reduced by a percentage. Accordingly, reducing the typical or average batch size by 25% would result in a batch size having normalized value of 0.75 that is equal to 75% of the hardware performance data that remains in the batch size. The purpose of adjusting batch size when testing inference performance is to achieve an optimal balance between latency (speed) and throughput (the total amount processed over time).

In some embodiments, the operation of controlling the amount of the hardware performance data that is used by the application program to perform the hardware failure prediction includes establishing a predetermined limit in the amount of the hardware performance data that is used by the application program to perform the hardware failure prediction for each of a plurality of ranges of the utilization level of the processor of the baseboard management controller. In one non-limiting example, a first utilization range ("low utilization") may include any BMC CPU utilization that is less than a first predetermined utilization value (such as 0.5; x<50%), a second utilization range ("moderate utilization") may include any BMC CPU utilization that is between the first predetermined utilization value and a second predetermined utilization value (such as between 0.5 and 0.75; 50%<x<75%), and a third utilization range ("high utilization") may include any BMC CPU utilization that is greater than the second predetermined utilization value (such as 0.75; x>75%). Furthermore, when the BMC CPU utilization falls within the first utilization range, then the batch size (amount of hardware performance data that is presently used to perform hardware failure prediction) is a first predetermined batch size (such as 1; 100%); within the second utilization range, then the batch size is a second predetermined batch size (such as 0.5; 50%); and within the third utilization range, then the batch size is a third predetermined batch size (such as 0.25; 25%). Optionally, any hardware performance data this is not input to the application program while the BMC CPU utilization is in the second or third utilization ranges ("moderate utilization" or "high utilization") may be held back and later input to the application program when the BMC CPU utilization is in the first utilization range ("low utilization"). Optionally, a batch size may be implemented for any number of BMC CPU utilization ranges.

In some embodiments, there may be no predetermined limit (in the amount of hardware performance data used) established for a first range of the utilization levels of the processor that are less than a first predetermined utilization value, a first predetermined limit is established for a second range of utilization levels that are greater than the first predetermined utilization value and less than a second predetermined utilization value, and a second predetermined limit is established for a third range of utilization levels that are greater than the second predetermined utilization value, wherein the first predetermined limit is less than the second predetermined limit, and wherein the second predetermined utilization value is greater than the first predetermined utilization value.

In some embodiments, the operation of controlling the amount of the hardware performance data that is used by the application program to perform the hardware failure prediction may include modifying a granularity of the hardware performance data. In other words, the batch size may be reduced by providing the application program with hardware performance data having a reduced sample rate (i.e., obtained from the hardware components at a reduced frequency), or the batch size may be increased by providing the application program with hardware performance data having an increased sample rate. For example, the hardware performance data from a single memory module might normally include a number of errors occurring during each of a series of a 1-minute intervals (periods of time) during a 1-hour period of time, such that the batch size includes 60 different error readings for the single memory module each hour. Embodiments may reduce the batch size submitted to the application program for the single memory module by collecting and/or delivering a number of errors occurring during each of a series of 5-minute intervals during the 1-hour period of time, such that the batch size includes only 12 different error readings for the single memory module each hour. Accordingly, reducing the sample rate from 60 datapoints (the number of error readings) per hour to 12 datapoints per hour will result in less computational load of running the application program on the BMC CPU. Data that identifies the number and/or type of errors every minute has finer granularity than data that identifies the number and/or type of errors every 5 minutes.

In some embodiments, the operation of controlling the amount of the hardware performance data that is used by the application program to perform the hardware failure prediction may include using the hardware performance data from a subset of the hardware devices. For example, the subset of the hardware performance data may be formed by limiting the hardware components from which the hardware performance data is collected. More specifically, the batch size of the hardware performance data may be reduced by including hardware performance data from fewer hardware components, such as those hardware components that are most-likely to experience a failure, those hardware components that are closest to reaching their expected lifetime, and/or those hardware components that would cause the greatest interruption should they experience an actual failure. Using any of these criteria, the hardware components may be ranked and selected to fill the reduced batch size giving priority to including the hardware performance data from the highest-ranked hardware components.

In some embodiments, operation of controlling the amount of the hardware performance data that is used by the application program to perform the hardware failure prediction may include reducing the amount of the hardware performance data that the application program will analyze during a first period of time. Subsequently, an amount of the hardware performance data that is not used to perform the hardware failure prediction during the first time period may be used to perform hardware failure prediction during a subsequent period of time. So, hardware performance data is obtained but not immediately used for hardware failure prediction may be used at a later time. In one option, the subsequent period of time is characterized by a utilization level of the processor of the baseboard management controller that is less than a predetermined utilization level. For example, hardware performance data that is not used to perform hardware failure prediction during a period of high BMC processor utilization may be used for hardware failure prediction during a period of low BMC processor utilization.

In some embodiments, the application program may be an artificial intelligence engine having an artificial intelligence model that has been trained for memory failure prediction, and wherein the hardware devices are memory devices. Optionally, the operation of obtaining the hardware performance data for the hardware devices installed in the server may include periodically reading, for each of a plurality of memory modules, memory performance data from a memory register on the memory module and/or a memory controller. For example, the memory performance data for each memory module includes a number of memory correctable errors.

In some embodiments, a server that includes the BMC may be subjected to a storm of thermal events, such as caused by a failure of a cooling fan or an ambient condition change. The loss of the cooling fan or a ambient condition change can cause the BMC to become flooded with thermal events (alerts) based on high temperatures measured by sensors throughout the server. The storm of thermal events will take more BMC CPU capacity to handle which will cause high CPU load. Unfortunately, it can take a significant amount of time, such as hours or days, to replace a fan in a server or make a change in ambient conditions (e.g. lower down ambient temperature). Accordingly, embodiments may reduce the batch size of the hardware performance data provided to the application program based on the number of thermal events during a most-recent trailing period of time. Optionally, the batch size may be adjusted based on a thermal event using any of the previously described manners for reducing the batch size based on the BMC CPU utilization.

Some embodiments provide a method comprising a baseboard management controller identifying a current utilization level of a processor of the baseboard management controller, the baseboard management controller obtaining hardware performance data for hardware devices installed in a server that includes the baseboard management controller, the baseboard management controller running an application program that performs hardware failure prediction, and the baseboard management controller controlling an amount of the hardware performance data that is used by the application program to perform the hardware failure prediction, wherein the amount of the hardware performance data is controlled as a function of the current utilization level of the processor. The foregoing method may further include any one or more operations described in reference to a computer program product. Similarly, the foregoing computer program products may further include program instructions for implementing or initiating any one or more aspects of the methods described herein.

Some embodiments provide a baseboard management controller comprising at least one non-volatile storage device storing program instructions and at least one processor configured to process the program instructions. The program instructions are configured to, when processed by the at least one processor, cause the baseboard management controller to perform operations comprising identifying a current utilization level of the processor of the baseboard management controller, obtaining hardware performance data for hardware devices installed in a server that includes the baseboard management controller, running an application program that performs hardware failure prediction, and controlling an amount of the hardware performance data that is used by the application program to perform the hardware failure prediction, wherein the amount of the hardware performance data is controlled as a function of the current utilization level of the processor. The foregoing baseboard management controller may further include or execute program instructions to perform any one or more of the operations described in reference to a computer program product or a method herein.

Embodiments of the system, method and computer program product may be implemented to improve the functioning of technology, such as improvements in the functioning of the computer itself. For example, reducing the load that an application program places on the BMC CPU may prevent the BMC CPU from becoming overloaded and causing latency or other degradation in the performance of other tasks for which the BMC is responsible. Furthermore, where the application program performs hardware failure prediction, such as memory failure prediction, there are substantial benefits to implementing and maintaining operation of such application programs even during periods of high load on the BMC CPU. For example, if a failure of a memory device can be accurately predicted before the memory device actually fails, then replacement of the memory device may be scheduled so that it is possible to avoid any shutdown or downtime of the server due to failure of the memory device. Currently, memory failure is one of the main causes of system shutdowns and downtime in datacenters.

Some embodiments may be directed to a workload-aware system for scheduling certain software tasks to be run by the BMC. Certain software tasks being run by the BMC may generate predictions and/or recommendations that cannot be immediately acted upon, perhaps due to delays in a user (personnel) taking action. The delays in taking action on a prediction or recommendation may be on the order of minutes to hours to execute. For example, tasks such as memory failure prediction (MFP) and other types of predictive failure analytics are valuable because these tasks enable proactive replacement of a component that is predicted to fail or the movement of workload away from a potentially failing component so that the system does not experience a shutdown, downtime, or errors due to the component actually failing. However, avoiding the consequences of a predicted hardware failure or implementing a recommended change in a failing hardware component may require that a user (personnel) obtain a replacement hardware component, access the server containing the failing hardware component, and physically substitute the replacement hardware component for the failing hardware component.

FIG. 1 is a diagram of one embodiment of a server 10. The server 10 includes a processor unit 14 that is coupled to a system bus 16. The processor unit 14 may utilize one or more processors, each of which has one or more processor cores. A graphics adapter 18, which drives/supports the display 30, is also coupled to system bus 16. The graphics adapter 18 may, for example, include a graphics processing unit (GPU). The system bus 16 is coupled via a bus bridge 22 to an input/output (I/O) bus 24. An I/O interface 26 is coupled to the I/O bus 24. The I/O interface 26 affords communication with various I/O devices, such as a keyboard 28 (perhaps as a touch screen virtual keyboard), and a USB mouse 34 via USB port(s) 36 (or other type of pointing device, such as a trackpad). As depicted, the server 10 may communicate with other devices over the network 11 using a network adapter or network interface controller (NIC) 40, which may be a Smart NIC. The hardware elements depicted in the server 10 are not intended to be exhaustive, but rather are representative. For instance, the server 10 may further include non-volatile memory and the like.

A hard drive interface 42 is also coupled to the system bus 16. The hard drive interface 42 interfaces with a hard drive 44. In a preferred embodiment, the hard drive 44 communicates with system memory 46, which is also coupled to the system bus 16. System memory is defined as the lowest level of volatile memory in the computer 10. This volatile memory may include additional higher levels of volatile memory (not shown), including, but not limited to, cache memory, registers and buffers. Data that populates the system memory 46 may include an operating system (OS) 48 and application programs 54.

The operating system 48 includes a shell 50 for providing transparent user access to resources such as application programs 54. Generally, the shell 50 is a program that provides an interpreter and an interface between the user and the operating system. More specifically, the shell 50 executes commands that are entered into a command line user interface or from a file. Thus, the shell 50, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 52) for processing. Note that while the shell 50 may be a text-based, line-oriented user interface, embodiments may support other user interface modes, such as graphical, voice, gestural, etc.

As depicted, the operating system 48 also includes the kernel 52, which may include lower levels of functionality for the operating system 48, including providing essential services required by other parts of the operating system 48 and application programs 54. Such essential services may include memory management, process and task management, disk management, and mouse and keyboard management. As shown, the server 10 includes application programs 54 in the system memory of the server 10.

The server 10 further includes the baseboard management controller (BMC) 60. The BMC may be used to perform out-of-band processing and may monitor and manage various features of the hardware components of the server. Furthermore, the BMC 60 may run and/or be responsible for obtaining hardware performance data from various hardware devices of the server 10, performing memory failure prediction, and other operations described herein. For example, the BMC 60 may read memory error registers 56 in order to obtain memory performance data, such as a number and type of memory errors.

Figure 2:
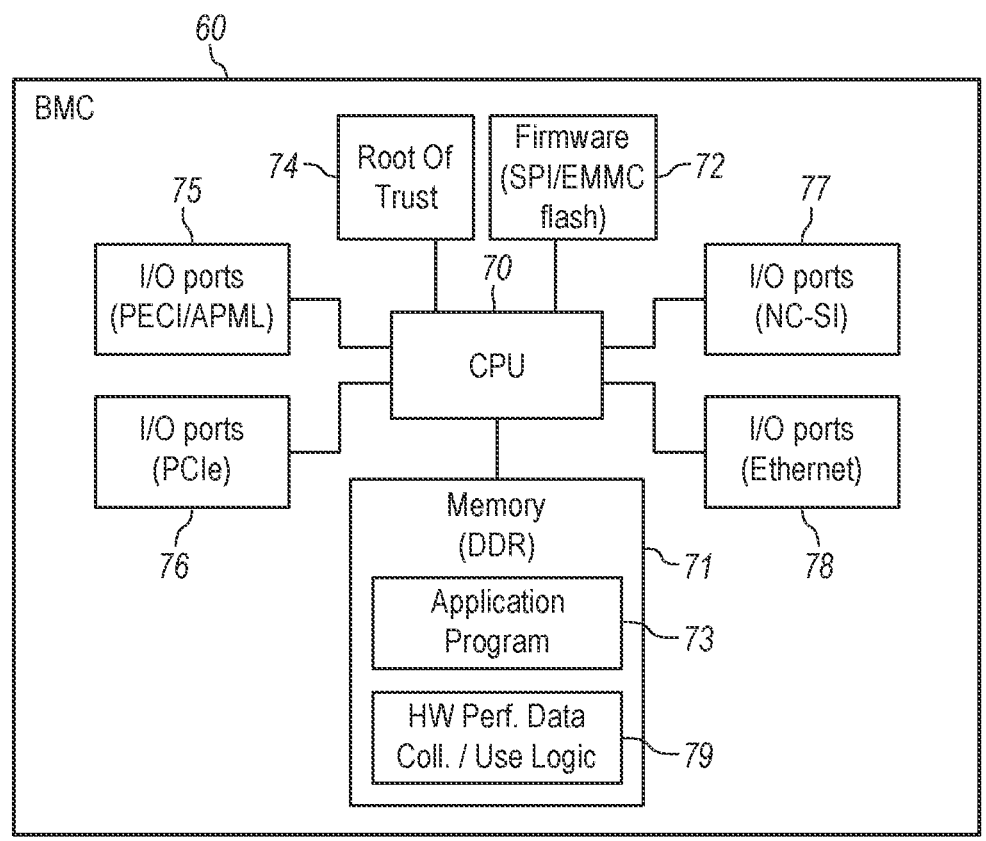
FIG. 2 is a diagram of a baseboard management controller (BMC) according to some embodiments.

FIG. 2 is a diagram of the baseboard management controller (BMC) 60 according to some embodiments. The BMC 60 is similar to a small computer or system on a chip (SoC), including a central processing unit (CPU) 70, memory 71 (such as random-access memory (RAM) on a double data rate (DDR) bus), firmware 72 on a flash memory (such as an embedded multi-media card (cMMC) flash memory or a serial peripheral interface (SPI) flash memory), and a root of trust (RoT) chip 74. The BMC 60 further includes a wide variety of input/output ports. For example, the input/output (I/O) ports may include I/O ports 75 to the hardware components of the server, such as a Platform Environment Control Interface (PECI) port and/or an Advanced Platform Management Link (APML) port; I/O ports 76 to the hardware components of the servers and/or a network interface controller (NIC), such as a Peripheral Component Interconnect Express (PCIe) port; I/O ports 77 to the NIC, such as a network controller sideband interface (NC-SI) port; and I/O ports 78 to a network that accessible to an external user, such as an Ethernet port. The CPU 70 of the BMC 60 may execute an application program 73 causing the CPU 70 to use any one or more of these I/O ports to interact with hardware devices installed on the server to obtain and use hardware performance data 79 for the hardware devices. Optionally, the output from the BMC 60 to a BMC web or Redfish interface may be routed through the I/O ports 78 to either directly to the network 11 (see FIG. 1) or to a network interface controller (NIC) 40 (see FIG. 1) and ultimately to the network 11 that is accessible through the NIC 40. Optionally, the NIC 40 may be a Smart NIC.

Figure 3:
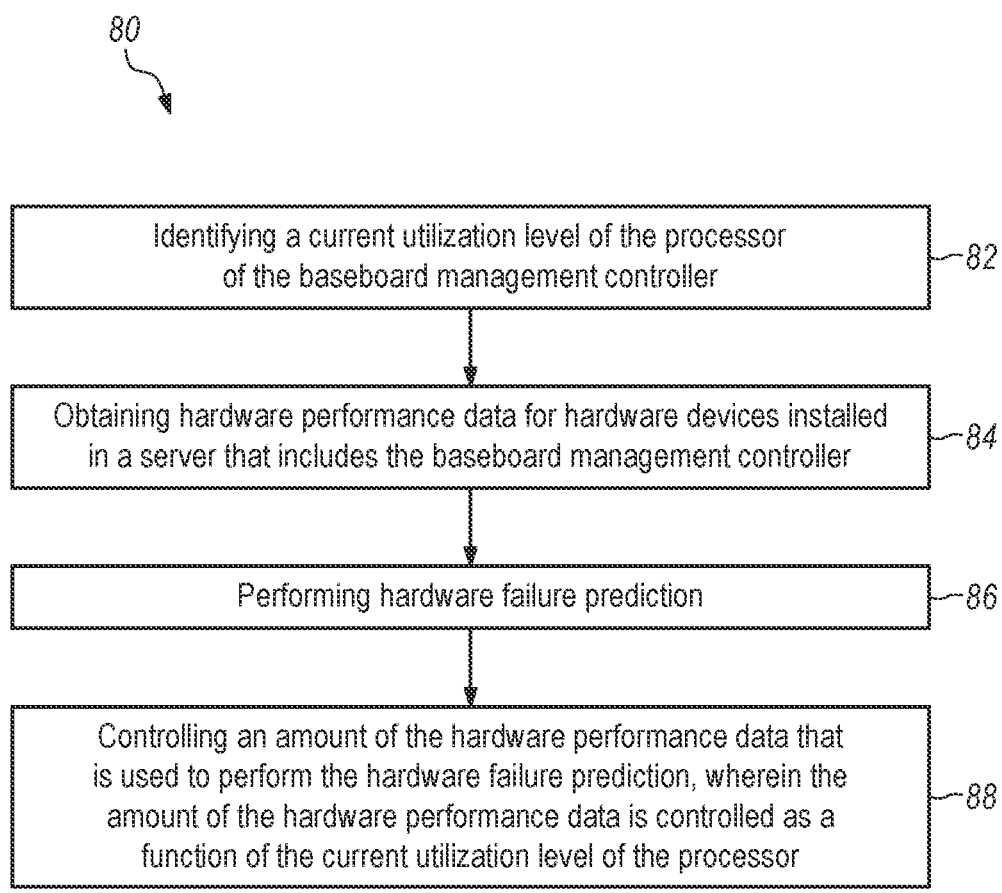
FIG. 3 is a flowchart of operations according to some embodiments.

FIG. 3 is a flowchart of operations 80 according to some embodiments. Operation 82 includes identifying a current utilization level of the processor of the baseboard management controller. Operation 84 includes obtaining hardware performance data for hardware devices installed in a server that includes the baseboard management controller. Operation 86 includes performing hardware failure prediction using at least some of the hardware performance data. Operation 88 includes controlling an amount of the hardware performance data that is used to perform the hardware failure prediction, wherein the amount of the hardware performance data is controlled as a function of the current utilization level of the processor. For example, the hardware failure prediction may be performed using a pre-training artificial intelligence (AI) model and inference with the data collected in Operation 84.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor of a baseboard management controller to cause the processor to perform operations comprising:
   identifying a current utilization level of the processor of the baseboard management controller;
   obtaining hardware performance data for hardware devices installed in a server that includes the baseboard management controller;
   running an application program that performs hardware failure prediction; and
   controlling an amount of the hardware performance data that is used by the application program to perform the hardware failure prediction, wherein the amount of the hardware performance data is controlled as a function of the current utilization level of the processor.

2. The computer program product of claim 1, the operations further comprising:
   providing a notification to a designated user device identifying one or more of the hardware devices that are predicted to experience a failure.

3. The computer program product of claim 2, wherein the notification is directed to a web browser or an email address.

4. The computer program product of claim 1, the operations further comprising:
   performing management functions without regard to the current utilization level of the processor.

5. The computer program product of claim 4, wherein the management functions include thermal control and/or sensor monitoring.

6. The computer program product of claim 1, wherein controlling the amount of the hardware performance data that is used by the application program to perform the hardware failure prediction includes reducing the amount of the hardware performance data that the application program will analyze as an inverse function of the current utilization level of the processor.

7. The computer program product of claim 1, wherein controlling the amount of the hardware performance data that is used by the application program to perform the hardware failure prediction includes establishing a predetermined limit in the amount of the hardware performance data that is used to perform the hardware failure prediction for each of a plurality of ranges of the utilization level of the processor of the baseboard management controller.

8. The computer program product of claim 7, wherein there is no predetermined limit established for a first range of the utilization levels of the processor that are less than a first predetermined utilization value, a first predetermined limit is established for a second range of utilization levels that are greater than the first predetermined utilization value and less than a second predetermined utilization value, and a second predetermined limit is established for a third range of utilization levels that are greater than the second predetermined utilization value, wherein the first predetermined limit is less than the second predetermined limit, and wherein the second predetermined utilization value is greater than the first predetermined utilization value.

9. The computer program product of claim 1, wherein controlling the amount of the hardware performance data that is used by the application program to perform the hardware failure prediction includes modifying a granularity of the hardware performance data.

10. The computer program product of claim 1, wherein controlling the amount of the hardware performance data that is used by the application program to perform the hardware failure prediction includes using the hardware performance data from a subset of the hardware devices.

11. The computer program product of claim 10, wherein the subset of the hardware devices is selected to include the hardware devices most-likely to experience a failure, the hardware devices closest to reaching their expected lifetime, and/or the hardware devices that would cause the greatest interruption due to an actual failure.

12. The computer program product of claim 1, wherein the application program is an artificial intelligence engine having an artificial intelligence model that has been trained for hardware failure prediction.

13. The computer program product of claim 1, wherein the application program is an artificial intelligence engine having an artificial intelligence model has been trained for memory failure prediction, and wherein the hardware devices are memory devices.

14. The computer program product of claim 13, wherein obtaining the hardware performance data for the hardware devices installed in the server includes periodically reading, for each of a plurality of memory modules, memory performance data from a memory register on the memory module and/or memory controller.

15. The computer program product of claim 14, wherein the memory performance data for each memory module includes a number of memory correctable errors.

16. The computer program product of claim 1, wherein controlling the amount of the hardware performance data that is used to perform the hardware failure prediction includes reducing the amount of the hardware performance data that the application program will analyze during a first period of time, and wherein an amount of the hardware performance data that is not used to perform the hardware failure prediction during the first time period is used to perform the hardware failure prediction during a subsequent period of time.

17. The computer program product of claim 16, wherein the subsequent period of time is characterized by a utilization level of the processor of the baseboard management controller that is less than a predetermined utilization level.

18. A method, comprising:
   a baseboard management controller identifying a current utilization level of a processor of the baseboard management controller;

the baseboard management controller obtaining hardware performance data for hardware devices installed in a server that includes the baseboard management controller;

the baseboard management controller running an application program that performs hardware failure prediction; and the baseboard management controller controlling an amount of the hardware performance data that is used by the application program to perform the hardware failure prediction, wherein the amount of the hardware performance data is controlled as a function of the current utilization level of the processor.

19. A baseboard management controller, comprising:

at least one non-volatile storage device storing program instructions; and at least one processor configured to process the program instructions, wherein the program instructions are configured to, when processed by the at least one processor, cause the baseboard management controller to perform operations comprising:

identifying a current utilization level of the processor of the baseboard management controller;

obtaining hardware performance data for hardware devices installed in a server that includes the baseboard management controller;

running an application program that performs hardware failure prediction; and controlling an amount of the hardware performance data that is used by the application program to perform the hardware failure prediction, wherein the amount of the hardware performance data is controlled as a function of the current utilization level of the processor.

20. The baseboard management controller of claim 19, wherein the application program is an artificial intelligence engine having an artificial intelligence model that has been trained for hardware failure prediction.

* * * * *